Aug. 11, 1959 W. SCHNEIDER 2,898,684
DIAL-INDICATING SLIDE GAUGE FOR MILLIMETERS AND INCHES
Filed Aug. 5, 1957

INVENTOR
WILHELM SCHNEIDER

Bailey, Stephens + Huettig
ATTORNEY

2,898,684
DIAL-INDICATING SLIDE GAUGE FOR MILLIMETERS AND INCHES

Wilhelm Schneider, Niedernhall, Germany

Application August 5, 1957, Serial No. 676,312

3 Claims. (Cl. 33—147)

The present invention relates to improvements in dial-indicating slide gauges or calipers.

Slide gauges which are provided with a dial for indicating the measured distance have already been known for some time. Such gauges have also been provided with two separate dials for indicating the measured distance both in millimeters and in inches.

It is the principal object of the present invention to provide a dial-indicating slide gauge or caliper on which the measured amount may be very easily and clearly read both in millimeters and in inches on a single dial, and which is of a very simple, sturdy, and foolproof construction.

More specifically it is an object of the present invention to provide a slide gauge of the type as described in which the measured amount is indicated on a single dial by means of two pointers or hands similar to those of a watch which are coaxially mounted and movable independently of each other by means of pinions which are in meshing engagement with a pair of gear racks which are mounted within a recess or groove which extends longitudinally within the slide bar and also serves as a housing of the pinions.

These and other objects, features, and advantages of the present invention will now be described in detail with reference to the accompanying drawings, in which—

Fig. 2 illustrates an enlarged transverse cross section of the slide gauge as illustrated in Fig. 1, taken through the center of the dial; while

Figure 1:
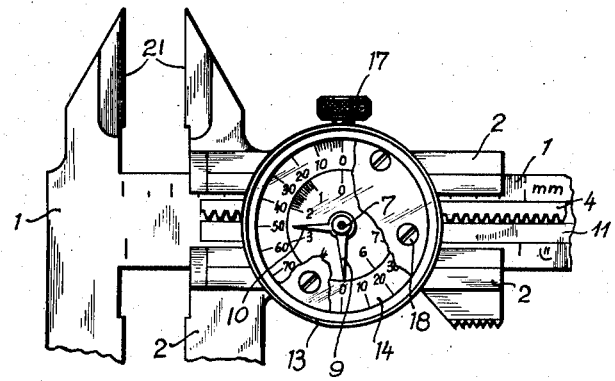
Fig. 1 illustrates a partial plan view of the slide gauge according to the invention.
Figure 2:
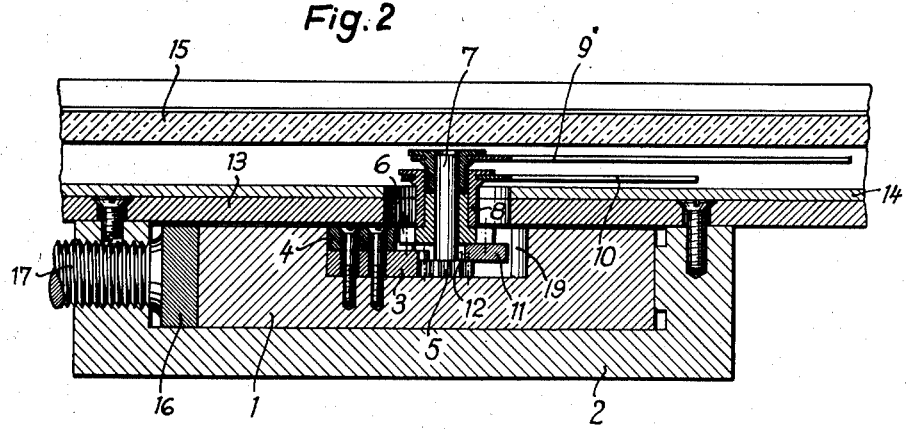

Referring to the drawings, the slide gauge according to the invention consists, as usual, of a slide bar 1 with a sleevelike slide member 2 slidably fitting over the same and guided by a flat spring 16 which is adapted to be pressed against slide bar 1 by means of a setscrew 17 to maintain the slide gauge in any position of adjustment. Slide bar 1 and slide member 2 have associated measuring surfaces 21 at one end extending transversely thereto. Slide member 2 carries a dial casing 13 which is secured thereto by means of countersunk screws. One of these screws as indicated at 18 secures casing 13 to a depth-gauge rod 11 which is slidably guided within a recess 19 in the upper surface of slide bar 1 and extending longitudinally thereof. Recess 19 also contains two superimposed gear racks 3 and 4 which are screwed to slide bar 1. The lower rack 3 for indicating in millimeters is wider than the upper rack 4 and engages with a pinion 5 which is secured to a shaft 7. The upper rack 4 which is mounted directly on the lower rack 3 and intended for measuring in inches engages with a pinion 8 forming a sleeve which is rotatably mounted on shaft 7 of pinion 5. The socketlike end of a pointer 9 within casing 13 is fitted tightly over the upper end of shaft 7 and serves for indicating the measured amount in millimeters while the sleevelike pinion 8 carries a pointer 10 for indicating the measured amount in inches.

The two pointers 9 and 10 are centrally disposed within casing 13 which is covered by a transparent disk 15. The bottom of casing 13 carries a dial face 14 with separate indications both in millimeters and inches. Thus, at each setting of the slide gauge, pointers 9 and 10 will permit separate and simultaneous readings of the measured amount both in inches and in millimeters.

Figure 3:
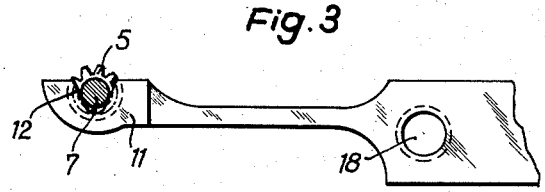
Fig. 3 illustrates an enlarged plan view of a detail of the new slide gauge.

As illustrated in Fig. 3, the end of the depth-gauge bar 11 which is secured by screw 18 to casing 13 is provided with a recess 12, the wall of which surrounds shaft 7 of pinion 5 and thus serves as a bearing thereof.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A dial-indicating slide gauge for both millimeters and inches comprising a slide bar, a slide member slidably mounted on said slide bar, said slide bar and slide member having associated measuring surfaces at one end thereof and extending transversely thereto, a single dial casing mounted on said slide member and having a dial face with separate indications in inches and in millimeters, said slide bar having a recess extending longitudinally thereof, a pair of superimposed racks mounted within said recess, a shaft rotatably mounted within said recess and having a pinion secured to one end, a sleeve rotatably mounted on said shaft and having a pinion secured to one end, and pointers secured to the other end of said shaft and said sleeve respectively, above said dial face, each of said pinions being in meshing engagement with one of said racks.

2. A dial-indicating gauge as defined in claim 1, further comprising a depth-gauge bar slidably guided within said recess in said slide bar, said depth-gauge bar having a recess at one end serving as a bearing, said shaft being rotatably mounted within said bearing.

3. A dial-indicating gauge as defined in claim 2, further comprising common means for securing said dial casing and said depth-gauge bar to said slide member so that, when said slide member is moved along said slide bar, said depth-gauge bar is moved likewise.

References Cited in the file of this patent

UNITED STATES PATENTS

| | | |
|---|---|---|
| 1,281,715 | Todt | Oct. 15, 1918 |
| 1,315,318 | Maddison | Sept. 9, 1919 |
| 2,581,128 | Mozur | Jan. 1, 1952 |

FOREIGN PATENTS

| | | |
|---|---|---|
| 27,579/'08 | Great Britain | Dec. 18, 1908 |